United States Patent
Ajax et al.

(10) Patent No.: US 11,686,492 B2
(45) Date of Patent: Jun. 27, 2023

(54) SYSTEMS AND METHODS FOR HVAC FILTER REPLACEMENT TYPE RECOMMENDATION

(71) Applicant: Johnson Controls Technology Company, Auburn Hills, MI (US)

(72) Inventors: Michael J. Ajax, Milwaukee, WI (US); Joseph R. Ribbich, Waukesha, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 232 days.

(21) Appl. No.: 17/080,297

(22) Filed: Oct. 26, 2020

(65) Prior Publication Data

US 2021/0041124 A1 Feb. 11, 2021

Related U.S. Application Data

(63) Continuation of application No. 15/951,842, filed on Apr. 12, 2018, now Pat. No. 10,816,234.

(Continued)

(51) Int. Cl.
*F24F 11/39* (2018.01)
*F24F 11/52* (2018.01)
(Continued)

(52) U.S. Cl.
CPC ............... *F24F 11/39* (2018.01); *F24F 8/10* (2021.01); *F24F 8/108* (2021.01); *F24F 11/52* (2018.01); *F24F 11/70* (2018.01); *F24F 13/28* (2013.01); *F24F 8/96* (2021.01); *F24F 2110/50* (2018.01); *F24F 2110/64* (2018.01); *F24F 2110/65* (2018.01); *F24F 2110/66* (2018.01);
(Continued)

(58) Field of Classification Search
CPC .. F24F 11/39; F24F 11/52; F24F 11/70; F24F 8/10; F24F 8/108; F24F 13/28; F24F 2110/50; F24F 2110/60; F24F 2110/64; F24F 2110/65; F24F 2110/66; F24F 2110/70; F24F 2140/50; F24F 2140/60; F24F 8/96
See application file for complete search history.

(56) References Cited

U.S. PATENT DOCUMENTS 5,772,732 A 6/1998 James et al.
6,448,896 B1 9/2002 Bankus et al.
(Continued)

FOREIGN PATENT DOCUMENTS

WO WO-2016/089688 A1 6/2016
WO WO-2017/146637 A1 8/2017

*Primary Examiner* — Robert Clemente
(74) *Attorney, Agent, or Firm* — Foley & Lardner LLP

(57) ABSTRACT

An HVAC system within a building including an HVAC device having an air filter, a number of sensors, and a control device. The control device has a processor that is configured to determine a current air quality metric based on air quality measurements received by the sensor. The control device is further configured to calculate an average air quality metric based on the current air quality metric and a set of previous air quality metrics. The control device is further configured to store the average air quality metric. The control device is further configured to generate an air filter type recommendation based on the average air quality metric.

20 Claims, 8 Drawing Sheets

Related U.S. Application Data

(60) Provisional application No. 62/485,780, filed on Apr. 14, 2017.

(51) Int. Cl.

| | | |
|---|---|---|
| *F24F 11/70* | (2018.01) | |
| *F24F 13/28* | (2006.01) | |
| *F24F 8/10* | (2021.01) | |
| *F24F 8/108* | (2021.01) | |
| *F24F 140/60* | (2018.01) | |
| *F24F 110/65* | (2018.01) | |
| *F24F 140/50* | (2018.01) | |
| *F24F 110/64* | (2018.01) | |
| *F24F 110/66* | (2018.01) | |
| *F24F 110/50* | (2018.01) | |
| *F24F 110/70* | (2018.01) | |
| *F24F 8/96* | (2021.01) | |

(52) U.S. Cl.
CPC ....... *F24F 2110/70* (2018.01); *F24F 2140/50* (2018.01); *F24F 2140/60* (2018.01); *Y02B 30/70* (2013.01)

(56) References Cited

U.S. PATENT DOCUMENTS

| | | |
|---|---|---|
| 6,993,414 B2 | 1/2006 | Shah |
| 7,150,408 B2 | 12/2006 | Deluca |
| 7,640,077 B2 | 12/2009 | Shah |
| 8,029,608 B1 | 10/2011 | Breslin |
| 8,091,796 B2 | 1/2012 | Amundson et al. |
| 8,239,066 B2 | 8/2012 | Jennings et al. |
| 8,574,343 B2 | 11/2013 | Bisson et al. |
| 8,613,792 B2 | 12/2013 | Ragland et al. |
| 8,704,672 B2 | 4/2014 | Hoglund et al. |
| 8,876,013 B2 | 11/2014 | Amundson et al. |
| 8,892,223 B2 | 11/2014 | Leen et al. |
| 9,080,784 B2 | 7/2015 | Dean-Hendricks et al. |
| 9,157,647 B2 | 10/2015 | Leen et al. |
| 9,261,888 B2 | 2/2016 | Pavlak et al. |
| 9,366,448 B2 | 6/2016 | Dean-Hendricks et al. |
| 9,552,715 B2 | 1/2017 | Breslin |
| 10,816,234 B2 * | 10/2020 | Ajax ................. F24F 11/39 |
| 2008/0014853 A1 | 1/2008 | Kim |
| 2013/0145784 A1 | 6/2013 | Bias et al. |
| 2013/0158723 A1 | 6/2013 | Erickson et al. |
| 2013/0325368 A1 | 12/2013 | Robb |
| 2014/0266755 A1 | 9/2014 | Arensmeier et al. |
| 2015/0159895 A1 | 6/2015 | Quam et al. |
| 2015/0330650 A1 | 11/2015 | Abiprojo et al. |
| 2017/0098230 A1 | 4/2017 | Orangkhadivi |
| 2017/0115851 A1 | 4/2017 | Eicher et al. |
| 2017/0159951 A1 | 6/2017 | Slessman et al. |
| 2018/0318746 A1 | 11/2018 | Thomas |
| 2019/0063770 A1 | 2/2019 | Vairamudi et al. |
| 2019/0264942 A1 | 8/2019 | Cheng et al. |
| 2019/0338978 A1 | 11/2019 | Joy et al. |
| 2020/0141604 A1 | 5/2020 | Chen et al. |

* cited by examiner

SYSTEMS AND METHODS FOR HVAC FILTER REPLACEMENT TYPE RECOMMENDATION

CROSS-REFERENCE TO RELATED PATENT APPLICATION

This application is a continuation of U.S. patent application Ser. No. 15/951,842, filed Apr. 12, 2018, which claims the benefit of and priority to U.S. Provisional Patent Application No. 62/485,780 filed Apr. 14, 2017, the entire disclosure of which is incorporated by reference herein.

BACKGROUND

The present invention relates generally to thermostats and more particularly to optimizing an air filter type used in a heating, ventilating, and air conditioning (HVAC) system based on a recommendation provided by a multi-function thermostat.

A thermostat is, in general, a component of an HVAC control system. Traditional thermostats sense the temperature of a system and control components of the HVAC in order to maintain a setpoint. A thermostat may be designed to control a heating or cooling system or an air conditioner. Thermostats are manufactured in many ways, and use a variety of sensors to measure temperature and other desired parameters of a system.

Conventional thermostats are configured for one-way communication to connected components, and to control HVAC systems by turning on or off certain components or by regulating flow. Each thermostat may include a temperature sensor and a user interface. The user interface typically includes a display for presenting information to a user and one or more user interface elements for receiving input from a user. To control the temperature of a building or space, a user adjusts the setpoint via the thermostat's user interface.

While some thermostats in HVAC control systems provide alerts to a user, alerts pertaining to air filters generally indicate when to replace the air filter. These systems simply provide a short-term benefit, but are not capable of providing intelligent recommendations for optimizing air quality in a building.

SUMMARY

One implementation of the present disclosure is an HVAC system within a building including an HVAC device having an air filter, one or more sensors, and a control device. The control device has a processor that is configured to determine a current air quality metric based on air quality measurements received by the one or more sensors. The control device is further configured to calculate an average air quality metric based on the current air quality metric and a set of previous air quality metrics. The control device is further configured to store the average air quality metric. The control device is further configured to generate an air filter type recommendation based on the average air quality metric.

In some embodiments, the control device is a thermostat.

In some embodiments, the one or more sensors include at least one of a volatile organic compound (VOC) sensor, a carbon dioxide sensor, and a pollen sensor.

In some embodiments, generating the air filter type recommendation based on the average air quality metric includes comparing the average air quality metric to a low threshold value. If the average air quality metric is less than the low threshold value, the control device generates an air filter type recommendation corresponding to a less restrictive filter.

In some embodiments, the less restrictive filter is configured to reduce energy consumption of the HVAC system.

In some embodiments, the less restrictive filter is a fiberglass filter or a similar pleated filter.

In some embodiments, generating the air filter type recommendation based on the average air quality metric includes comparing the average air quality metric to a high threshold value. If the average air quality metric is greater than the high threshold value, the control device generates an air filter type recommendation corresponding to a more restrictive filter.

In some embodiments, the more restrictive filter is configured to improve air quality in the building.

In some embodiments, the more restrictive filter is a HEPA filter, a carbon filter, or another similar filter.

In some embodiments, the thermostat includes a touch-sensitive panel.

Another implementation of the present disclosure is a method for recommending filter types to be used in an HVAC system of a building. The method includes obtaining a measurement of air quality within the building using one or more sensors. The method further includes calculating a current air quality metric based on the measurement. The method further includes calculating an average air quality metric based on the current air quality metric and a set of previous air quality metrics. The method further includes generating an air filter type recommendation based on the average air quality metric.

In some embodiments, the method further includes comparing the average air quality metric to a low threshold value.

In some embodiments, the air filter type recommendation is for a less restrictive filter configured to reduce energy consumption of the HVAC system if the average air quality metric is less than the low threshold value.

In some embodiments, the less restrictive filter is a fiberglass filter or a similar pleated filter.

In some embodiments, the method further includes comparing the average air quality metric to a high threshold value.

In some embodiments, the air filter type recommendation is for a more restrictive filter configured to improve air quality within the building if the average air quality metric is greater than the high threshold value.

In some embodiments, the more restrictive filter is a HEPA filter, a carbon filter, or another similar filter.

In some embodiments, the air filter type recommendation is for a similar type of filter as is currently installed if the average air quality metric is less than the high threshold value and greater than the low threshold value.

In some embodiments, the control device is a thermostat.

In some embodiments, the one or more sensors include at least one of a volatile organic compound (VOC) sensor, a carbon dioxide sensor, and a pollen sensor.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to the FIGURES, a user control device is shown, according to some embodiments. The user control device described herein may be a thermostat used in any HVAC system, room, environment, or system within which it is desired to control and/or observe environmental conditions (e.g., temperature, humidity, etc.). In traditional HVAC systems, a thermostat may be adjusted by a user to control the temperature of a system.

The user control device is intended to provide the user with an ability to function as a connected smart hub. The thermostat provides a desirable user interface for other environmental controls because of its known fixed location within a space. The user control device is intended to be more personal, more efficient, and more aware than traditional thermostats.

The user control device collects data about a space and the occupants of the space with various sensors (e.g., temperature sensors, humidity sensors, acoustic sensors, optical sensors, gas and other chemical sensors, biometric sensors, motion sensors, etc.) and user inputs. The user control device may utilize data collected from a single room, multiple rooms, an entire building, or multiple buildings. The data may be analyzed locally by the user control device or may be uploaded to a remote computing system and/or the cloud for further analysis and processing.

Building Management System and HVAC System

Figure 1:
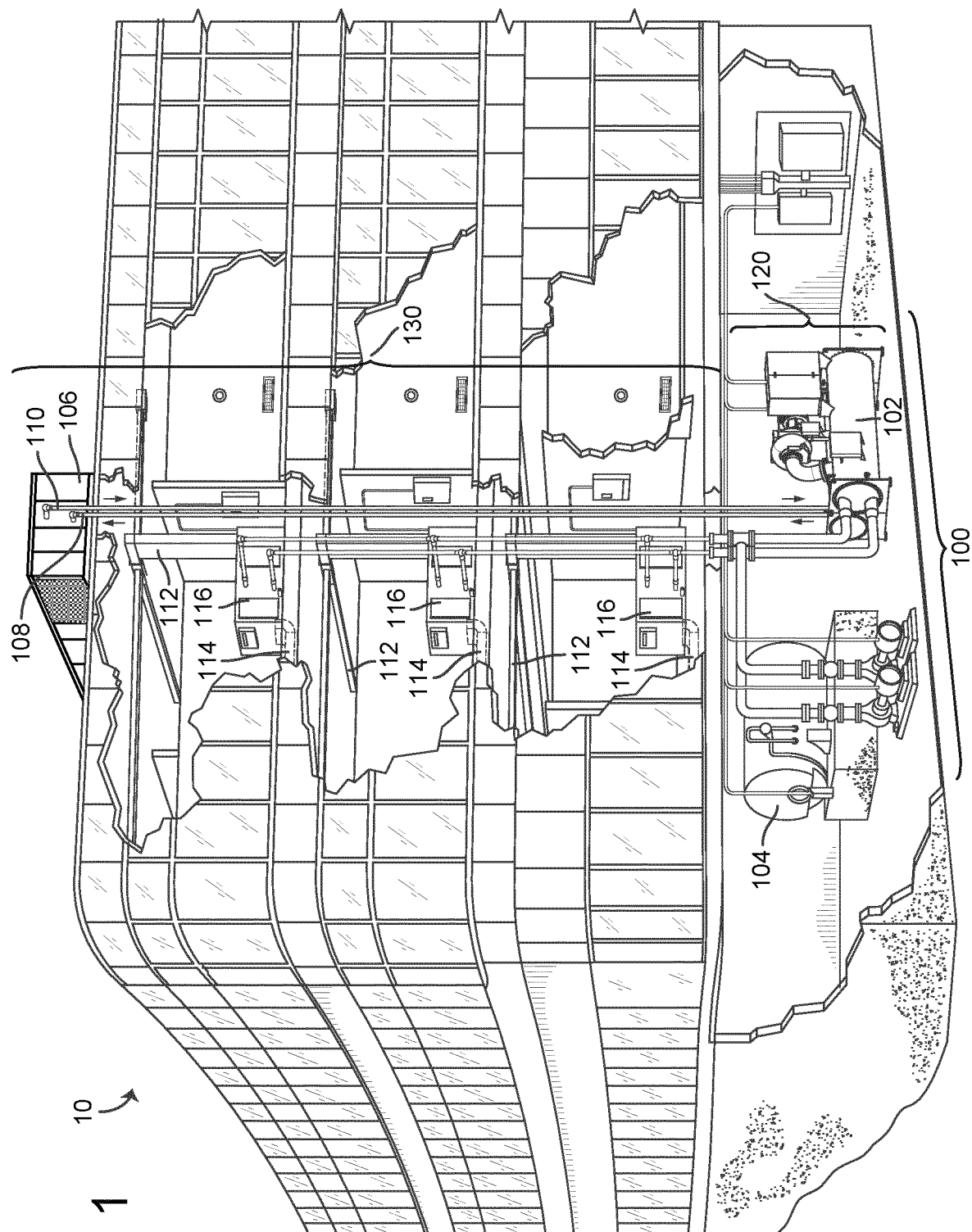
FIG. 1 is a drawing of a building equipped with a HVAC system, according to embodiments.

Referring now to FIGS. 1-4, a building management system (BMS) and HVAC system in which the systems and methods of the present disclosure may be implemented are shown, according to an embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. A waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
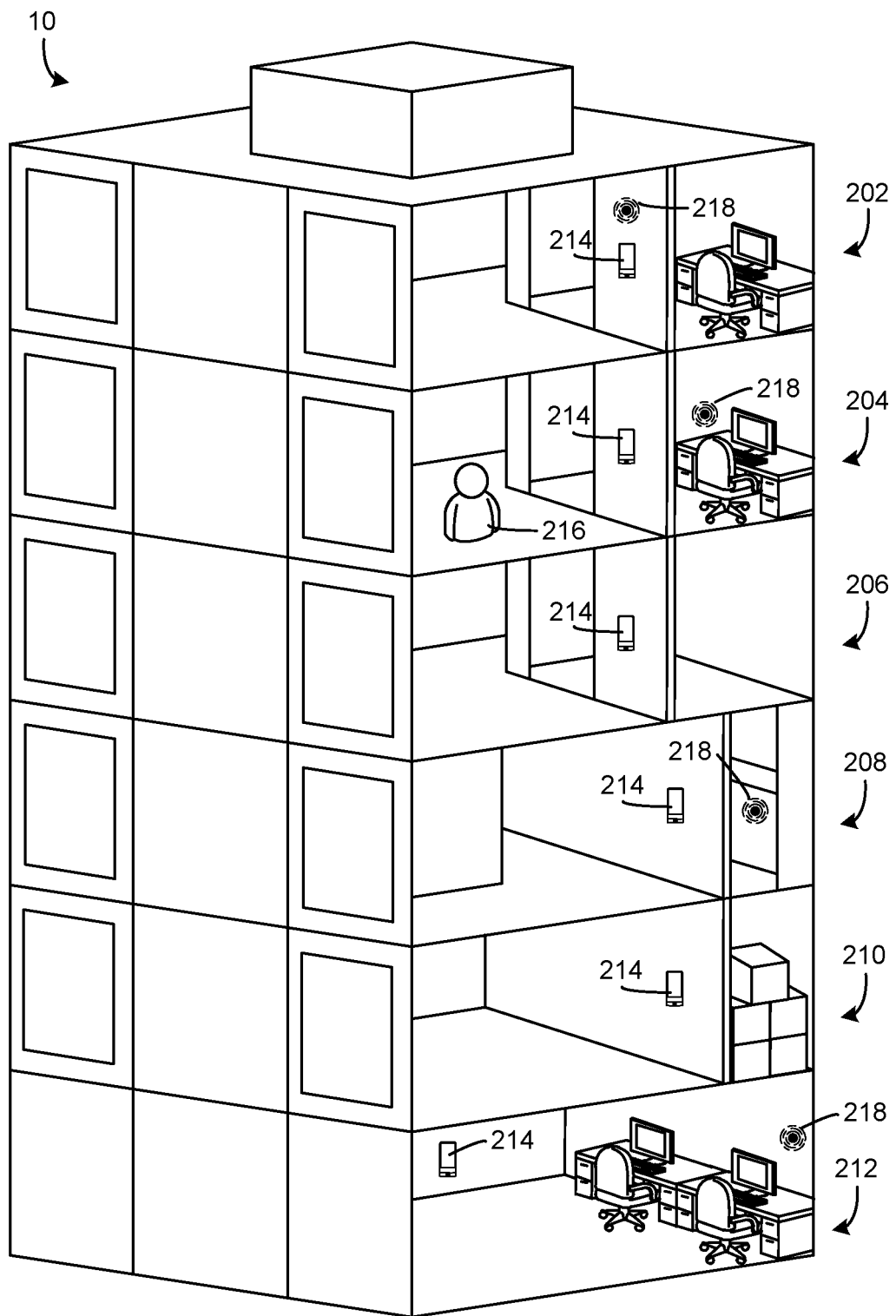
FIG. 2 is a drawing of multiple zones and floors of the building of FIG. 1 equipped with control devices, according to embodiments.

Referring now to FIG. 2, building 10 is shown in greater detail, according to an embodiment. Building 10 may have multiple zones. In FIG. 2, building 10 has zones, 202, 204, 206, 208, 210, and 212. In building 10, the zones each correspond to a separate floor. In various embodiments, the zones of building 10 may be rooms, sections of a floor, multiple floors, etc. Each zone may have a corresponding control device 214. In some embodiments, control device 214 is at least one of a thermostat, a sensor, a controller, a display device, a concierge device, a medical monitor device, etc. Control device 214 may take input from users. The input may be an environmental setpoint, a concierge question, a payment, etc. In some embodiments, control device 214 can cause music and/or building announcements to be played in one or more of zones 202-212, cause the temperature and/or humidity to be regulated in one or more of zones 202-212, and/or any other control action.

In some embodiments, control device 214 can monitor the health of an occupant 216 of building 10. In some embodiments, control device 214 monitors heat signatures, heart-rates, and any other information that can be collected from cameras, medical devices, and/or any other health related sensor. In some embodiments, building 10 has wireless transmitters 218 in each or some of zones 202-212. The wireless transmitters 218 may be routers, coordinators, and/or any other device broadcasting radio waves. In some embodiments, wireless transmitters 218 form a Wi-Fi network, a Zigbee network, a Bluetooth network, and/or any other kind of network.

In some embodiments, occupant 216 has a mobile device that can communicate with wireless transmitters 218. Control device 214 may use the signal strengths between the mobile device of occupant 216 and the wireless transmitters 218 to determine what zone the occupant is in. In some embodiments, control device 214 causes temperature setpoints, music and/or other control actions to follow occupant 216 as the occupant 216 moves from one zone to another zone (i.e., from one floor to another floor).

In some embodiments, display devices 214 are connected to a building management system, a weather server, and/or a building emergency sensor(s). In some embodiments, display devices 214 may receive emergency notifications from the building management system, the weather server, and/or the building emergency sensor(s). Based on the nature of the emergency, display devices 214 may give directions to an occupant of the building. In some embodiments, the direction may be to respond to an emergency (e.g., call the police, hide and turn the lights off, etc.) In various embodiments, the directions given to the occupant (e.g., occupant 216) may be navigation directions. For example, zone 212 may be a safe zone with no windows an individual (e.g., occupant 216). If display devices 214 determines that there are high winds around building 10, the control device 214 may direct occupants of zones 202-210 to zone 212 if zone 212 has no windows.

Figure 3:
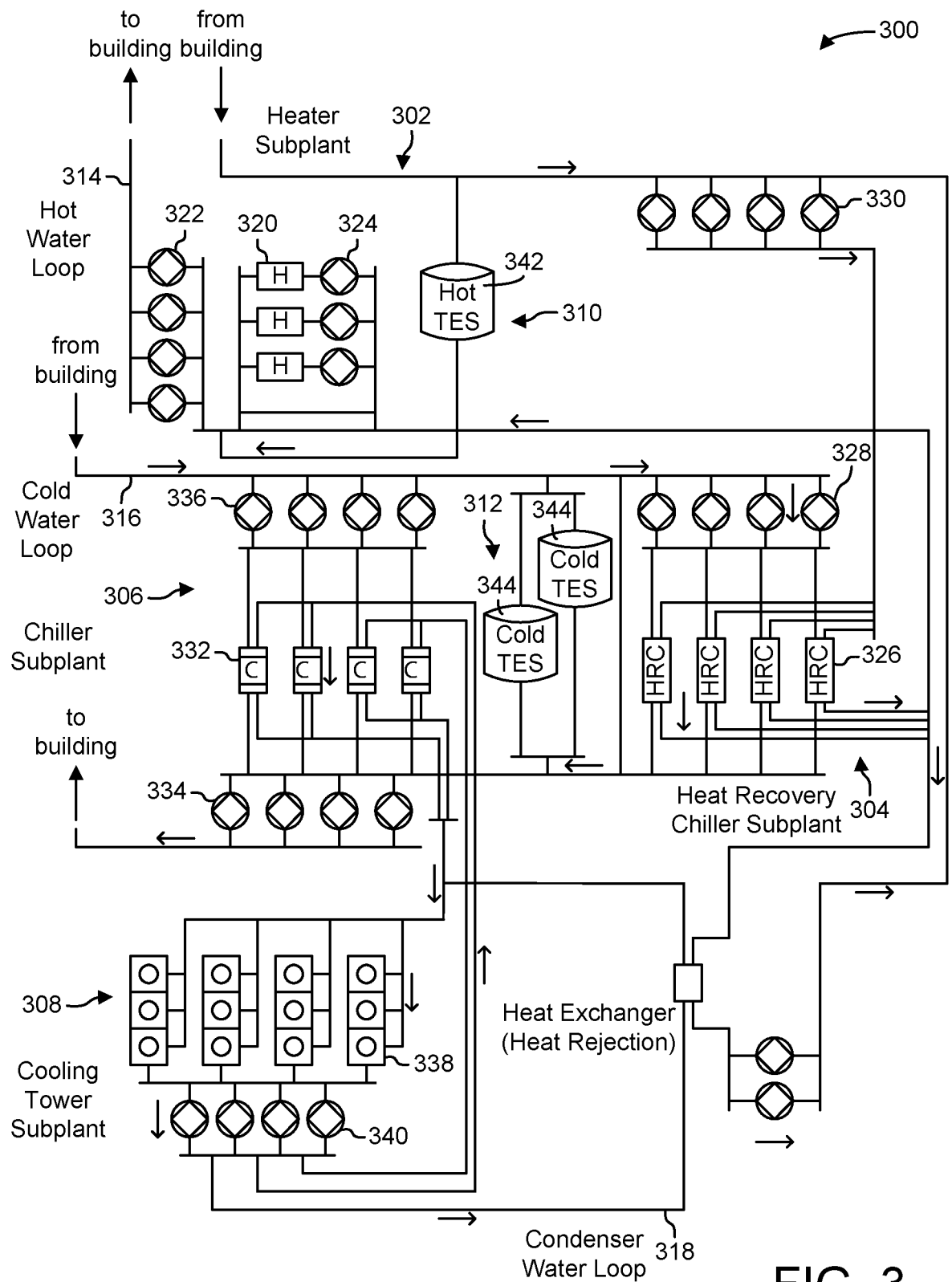
FIG. 3 is a block diagram of a waterside system that may be used in conjunction with the building of FIGS. 1-2, according to embodiments.

Referring now to FIG. 3, a block diagram of a waterside system 300 is shown, according to an embodiment. In various embodiments, waterside system 300 may supplement or replace waterside system 120 in HVAC system 100 or may be implemented separate from HVAC system 100. When implemented in HVAC system 100, waterside system 300 may include a subset of the HVAC devices in HVAC system 100 (e.g., boiler 104, chiller 102, pumps, valves, etc.) and may operate to supply a heated or chilled fluid to AHU 106. The HVAC devices of waterside system 300 may be located within building 10 (e.g., as components of waterside system 120) or at an offsite location such as a central plant.

In FIG. 3, waterside system 300 is shown as a central plant having a plurality of subplants 302-312. Subplants 302-312 are shown to include a heater subplant 302, a heat recovery chiller subplant 304, a chiller subplant 306, a cooling tower subplant 308, a hot thermal energy storage (TES) subplant 310, and a cold thermal energy storage (TES) subplant 312. Subplants 302-312 consume resources (e.g., water, natural gas, electricity, etc.) from utilities to serve the thermal energy loads (e.g., hot water, cold water, heating, cooling, etc.) of a building or campus. For example, heater subplant 302 may be configured to heat water in a hot water loop 314 that circulates the hot water between heater subplant 302 and building 10. Chiller subplant 306 may be configured to chill water in a cold water loop 316 that circulates the cold water between chiller subplant 306 building 10. Heat recovery chiller subplant 304 may be configured to transfer heat from cold water loop 316 to hot water loop 314 to provide additional heating for the hot water and additional cooling for the cold water. Condenser water loop 318 may absorb heat from the cold water in chiller subplant 306 and reject the absorbed heat in cooling tower subplant 308 or transfer the absorbed heat to hot water loop 314. Hot TES subplant 310 and cold TES subplant 312 may store hot and cold thermal energy, respectively, for subsequent use.

Hot water loop 314 and cold water loop 316 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 302-312 to receive further heating or cooling.

Although subplants 302-312 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 302-312 may provide heating and/or cooling directly to the building or campus without requiring an intermediate heat transfer fluid. These and other variations to waterside system 300 are within the teachings of the present disclosure.

Each of subplants 302-312 may include a variety of equipment configured to facilitate the functions of the subplant. For example, heater subplant 302 is shown to include a plurality of heating elements 320 (e.g., boilers, electric heaters, etc.) configured to add heat to the hot water in hot water loop 314. Heater subplant 302 is also shown to include several pumps 322 and 324 configured to circulate the hot water in hot water loop 314 and to control the flow rate of the hot water through individual heating elements 320. Chiller subplant 306 is shown to include a plurality of chillers 332 configured to remove heat from the cold water in cold water loop 316. Chiller subplant 306 is also shown to include several pumps 334 and 336 configured to circulate the cold water in cold water loop 316 and to control the flow rate of the cold water through individual chillers 332.

Heat recovery chiller subplant 304 is shown to include a plurality of heat recovery heat exchangers 326 (e.g., refrigeration circuits) configured to transfer heat from cold water loop 316 to hot water loop 314. Heat recovery chiller subplant 304 is also shown to include several pumps 328 and 330 configured to circulate the hot water and/or cold water through heat recovery heat exchangers 326 and to control the flow rate of the water through individual heat recovery heat exchangers 226. Cooling tower subplant 208 is shown to include a plurality of cooling towers 338 configured to remove heat from the condenser water in condenser water loop 318. Cooling tower subplant 308 is also shown to include several pumps 340 configured to circulate the condenser water in condenser water loop 318 and to control the flow rate of the condenser water through individual cooling towers 338.

Hot TES subplant 310 is shown to include a hot TES tank 342 configured to store the hot water for later use. Hot TES subplant 310 may also include one or more pumps or valves configured to control the flow rate of the hot water into or out of hot TES tank 342. Cold TES subplant 312 is shown to include cold TES tanks 344 configured to store the cold water for later use. Cold TES subplant 312 may also include one or more pumps or valves configured to control the flow rate of the cold water into or out of cold TES tanks 344.

In some embodiments, one or more of the pumps in waterside system 300 (e.g., pumps 322, 324, 328, 330, 334, 336, and/or 340) or pipelines in waterside system 300 include an isolation valve associated therewith. Isolation valves may be integrated with the pumps or positioned upstream or downstream of the pumps to control the fluid flows in waterside system 300. In various embodiments, waterside system 300 may include more, fewer, or different types of devices and/or subplants based on the particular configuration of waterside system 300 and the types of loads served by waterside system 300.

Figure 4:
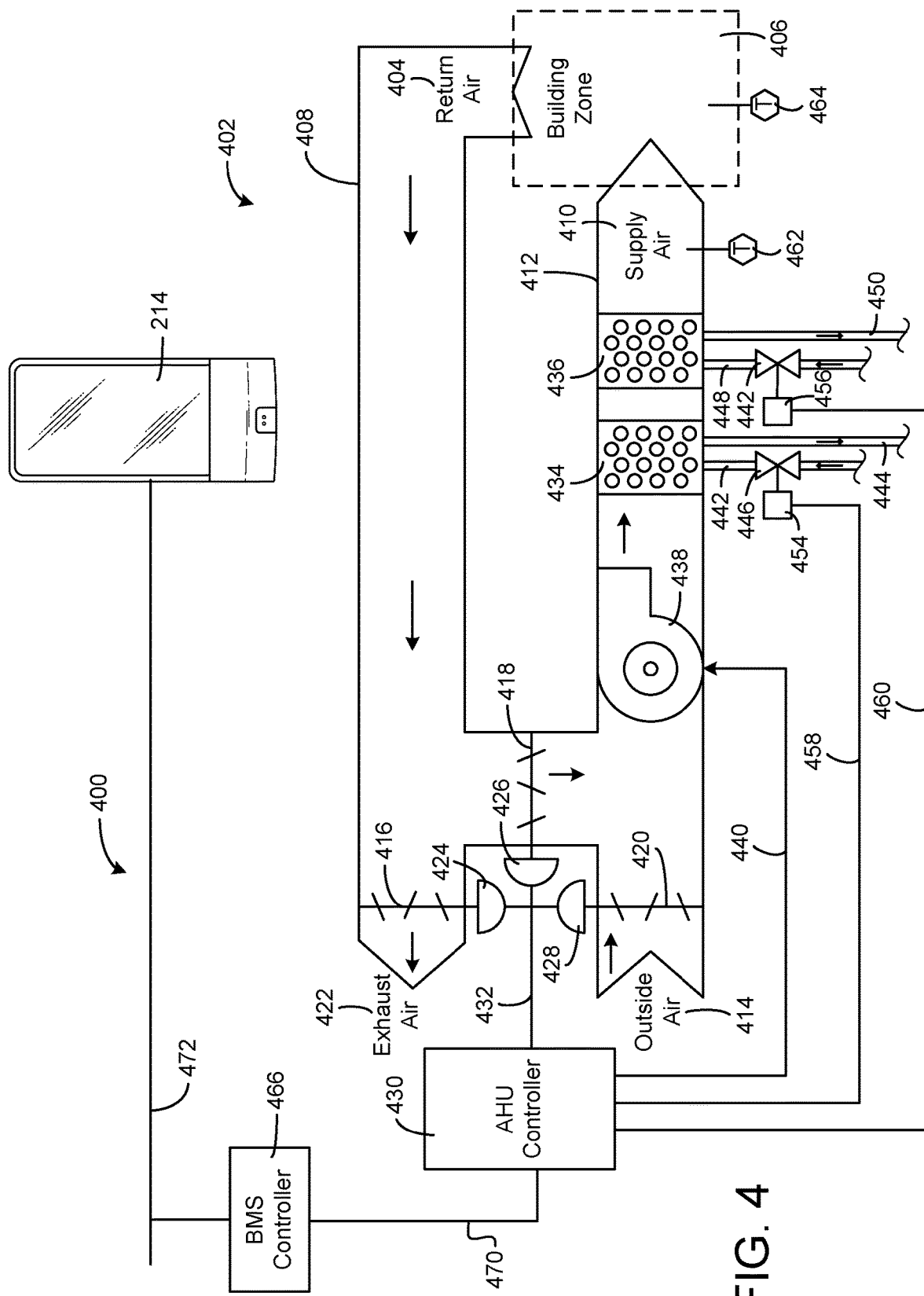
FIG. 4 is a block diagram of an airside system that may be used in conjunction with the building of FIGS. 1-2, according to embodiments.

Referring now to FIG. 4, airside system 400 is shown to include an economizer-type air handling unit (AHU) 402. Economizer-type AHUs vary the amount of outside air and return air used by the air handling unit for heating or cooling. For example, AHU 402 may receive return air 404 from building zone 406 via return air duct 408 and may deliver supply air 410 to building zone 406 via supply air duct 612. In some embodiments, AHU 402 is a rooftop unit located on the roof of building 10 (e.g., AHU 4506 as shown in FIG. 1) or otherwise positioned to receive both return air 404 and outside air 414. AHU 402 may be configured to operate exhaust air damper 416, mixing damper 418, and outside air damper 420 to control an amount of outside air 414 and return air 404 that combine to form supply air 410. Any return air 404 that does not pass through mixing damper 418 may be exhausted from AHU 402 through exhaust damper 416 as exhaust air 422.

Each of dampers 416-420 may be operated by an actuator. For example, exhaust air damper 416 may be operated by actuator 424, mixing damper 418 may be operated by actuator 426, and outside air damper 420 may be operated by actuator 428. Actuators 424-428 may communicate with an AHU controller 430 via a communications link 432. Actuators 424-428 may receive control signals from AHU controller 430 and may provide feedback signals to AHU controller 430. Feedback signals may include, for example, an indication of a current actuator or damper position, an amount of torque or force exerted by the actuator, diagnostic information (e.g., results of diagnostic tests performed by actuators 424-428), status information, commissioning information, configuration settings, calibration data, and/or other types of information or data that may be collected, stored, or used by actuators 424-428. AHU controller 430 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 424-428.

Still referring to FIG. 4, AHU 402 is shown to include a cooling coil 434, a heating coil 436, and a fan 438 positioned within supply air duct 612. Fan 438 may be configured to force supply air 410 through cooling coil 434 and/or heating coil 436 and provide supply air 410 to building zone 406. AHU controller 430 may communicate with fan 438 via communications link 440 to control a flow rate of supply air 410. In some embodiments, AHU controller 430 controls an amount of heating or cooling applied to supply air 410 by modulating a speed of fan 438.

Cooling coil 434 may receive a chilled fluid from waterside system 200 (e.g., from cold water loop 316) via piping 442 and may return the chilled fluid to waterside system 200 via piping 444. Valve 446 may be positioned along piping 442 or piping 444 to control a flow rate of the chilled fluid through cooling coil 474. In some embodiments, cooling coil 434 includes multiple stages of cooling coils that can be independently activated and deactivated (e.g., by AHU controller 430, by BMS controller 466, etc.) to modulate an amount of cooling applied to supply air 410.

Heating coil 436 may receive a heated fluid from waterside system 200 (e.g., from hot water loop 314) via piping 448 and may return the heated fluid to waterside system 200 via piping 450. Valve 452 may be positioned along piping 448 or piping 450 to control a flow rate of the heated fluid through heating coil 436. In some embodiments, heating coil 436 includes multiple stages of heating coils that can be independently activated and deactivated (e.g., by AHU controller 430, by BMS controller 466, etc.) to modulate an amount of heating applied to supply air 410.

Each of valves 446 and 452 may be controlled by an actuator. For example, valve 446 may be controlled by actuator 454 and valve 452 may be controlled by actuator 456. Actuators 454-456 may communicate with AHU controller 430 via communications links 458-460. Actuators 454-456 may receive control signals from AHU controller 430 and may provide feedback signals to controller 430. In some embodiments, AHU controller 430 receives a measurement of the supply air temperature from a temperature sensor 462 positioned in supply air duct 612 (e.g., downstream of cooling coil 434 and/or heating coil 436). AHU controller 430 may also receive a measurement of the temperature of building zone 406 from a temperature sensor 464 located in building zone 406.

In some embodiments, AHU controller 430 operates valves 446 and 452 via actuators 454-456 to modulate an amount of heating or cooling provided to supply air 410 (e.g., to achieve a set point temperature for supply air 410 or to maintain the temperature of supply air 410 within a set point temperature range). The positions of valves 446 and 452 affect the amount of heating or cooling provided to supply air 410 by cooling coil 434 or heating coil 436 and may correlate with the amount of energy consumed to achieve a desired supply air temperature. AHU 430 may control the temperature of supply air 410 and/or building zone 406 by activating or deactivating coils 434-436, adjusting a speed of fan 438, or a combination of both.

Still referring to FIG. 4, airside system 400 is shown to include a building management system (BMS) controller 466 and a control device 214. BMS controller 466 may include one or more computer systems (e.g., servers, supervisory controllers, subsystem controllers, etc.) that serve as system level controllers, application or data servers, head nodes, or master controllers for airside system 400, waterside system 200, HVAC system 100, and/or other controllable systems that serve building 10. BMS controller 466 may communicate with multiple downstream building systems or subsystems (e.g., HVAC system 100, a security system, a lighting system, waterside system 200, etc.) via a communications link 470 according to like or disparate protocols (e.g., LON, BACnet, etc.). In various embodiments, AHU controller 430 and BMS controller 466 may be separate (as shown in FIG. 4) or integrated. In an integrated implementation, AHU controller 430 may be a software module configured for execution by a processor of BMS controller 466.

In some embodiments, AHU controller 430 receives information from BMS controller 466 (e.g., commands, set points, operating boundaries, etc.) and provides information to BMS controller 466 (e.g., temperature measurements, valve or actuator positions, operating statuses, diagnostics, etc.). For example, AHU controller 430 may provide BMS controller 466 with temperature measurements from temperature sensors 462-464, equipment on/off states, equipment operating capacities, and/or any other information that can be used by BMS controller 466 to monitor or control a variable state or condition within building zone 406.

Control device 214 may include one or more of the user control devices. Control device 214 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Control device 214 may be a computer workstation, a client terminal, a remote or local interface, or any other type of user interface device. Control device 214 may be a stationary terminal or a mobile device. For example, control device 214 may be a desktop computer, a computer server with a user interface, a laptop computer, a tablet, a smartphone, a PDA, or any other type of mobile or non-mobile device. Control device 214 may communicate with BMS controller 466 and/or AHU controller 430 via communications link 472.

Figure 5:
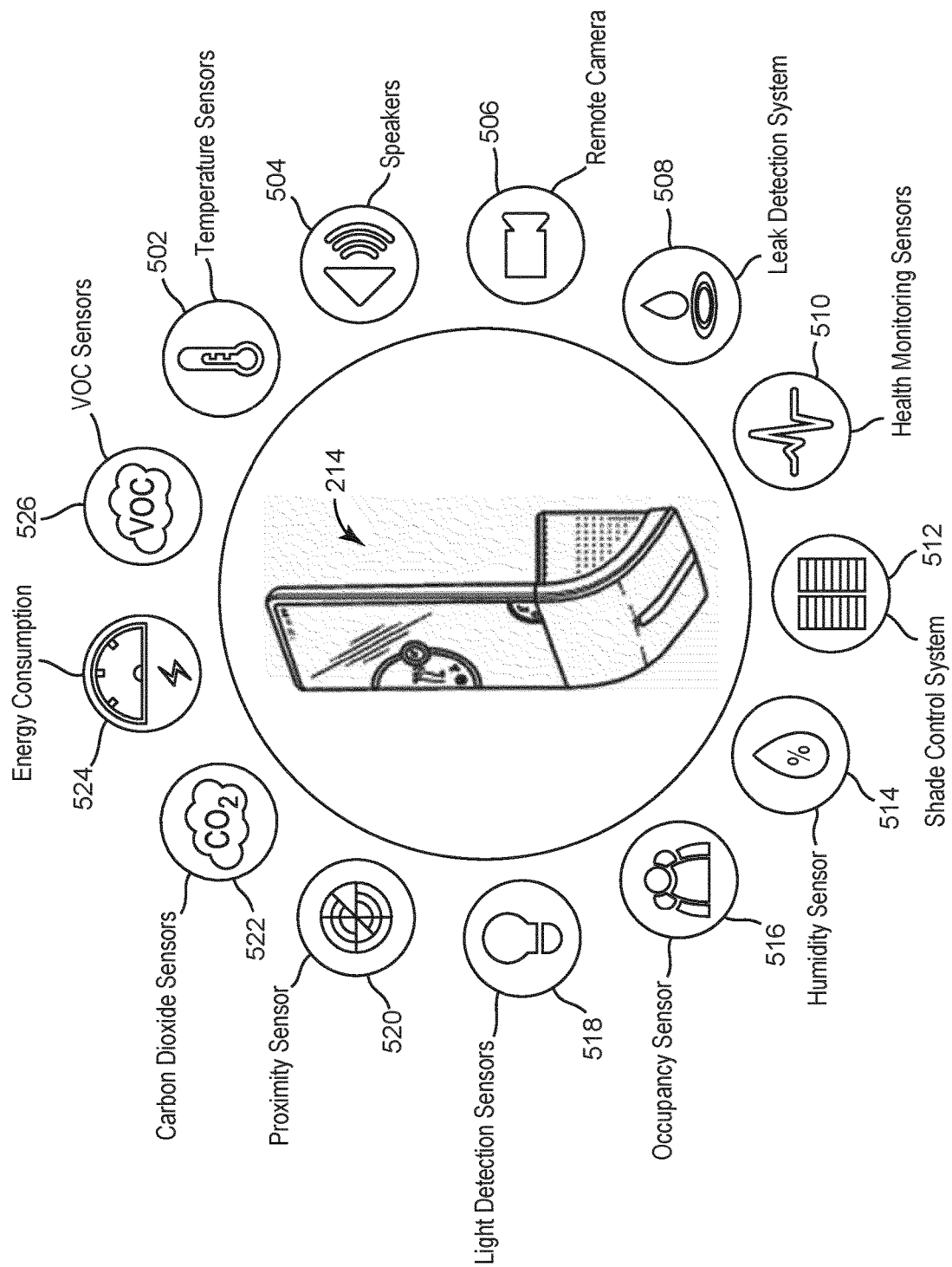
FIG. 5 is a drawing of the connections of the control device of FIG. 2 and FIG. 4, according to embodiments.

Referring now to FIG. 5, control device 214 is shown as a connected smart hub or private area network (PAN), according to some embodiments. Control device 214 may include a variety of sensors and may be configured to communicate with a variety of external systems or devices. For example, control device 214 may include temperature sensors 502, speakers 504, leak detection system 508, health monitoring sensors 510, humidity sensors 514, occupancy sensors 516, light detection sensors 518, proximity sensor 520, carbon dioxide sensors 522, energy consumption sensors 524, volatile organic compound (VOC) sensors 526, or any of a variety of other sensors. Alternatively, control device 214 may receive input from external sensors configured to measure such variables. The external sensors may not communicate over a PAN network but may communicate with control device 214 via an IP based network and/or the Internet.

In some embodiments, the temperature sensors 502, the humidity sensors 514, the carbon dioxide sensors 522, and the VOC sensors 526 may be located at different locations within a building or home. Additionally, one or more of the temperature sensors 502, the humidity sensors 514, the carbon dioxide sensors 522, and the VOC sensors 526 may be located outside of the building or home to measure aspects of the outside air, such as outdoor temperature, outdoor humidity, carbon dioxide levels and VOC levels in the outside air. In further embodiments, the control device 214 may communicate with sensors both inside the building or home as well as outside the building or home.

In some embodiments, speakers 504 are located locally as a component of control device 214. Speakers 504 may be low power speakers used for playing audio to the immediate occupant of control device 214 and/or occupants of the zone in which control device 214 is located. In some embodiments, speakers 504 may be remote speakers connected to control device 214 via a network. In some embodiments, speakers 504 are a building audio system, an emergency alert system, and/or alarm system configured to broadcast building wide and/or zone messages or alarms.

Control device 214 may communicate with a remote camera 506, a shade control system 512, a leak detection system 508, an HVAC system, or any of a variety of other external systems or devices which may be used in a home automation system or a building automation system. Control device 214 may provide a variety of monitoring and control interfaces to allow a user to control all of the systems and devices connected to control device 214. Embodiments of user interfaces and features of control device 214 are described in greater detail below.

Figure 6:
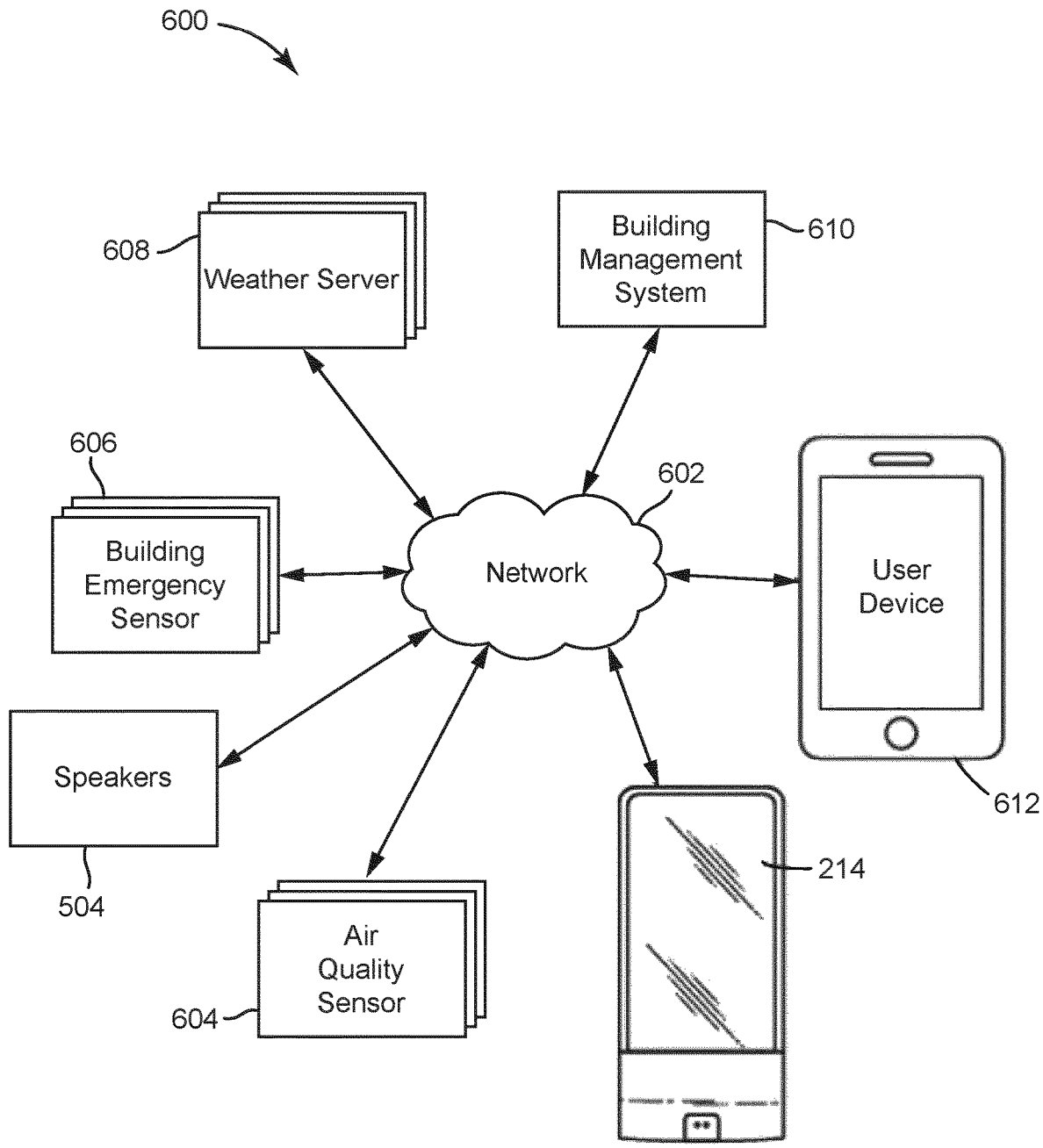
FIG. 6 is a diagram of a communications system located in the building of FIGS. 1 and 2, according to embodiments.

Referring now to FIG. 6, a block diagram of communications system 600 is shown, according to some embodiments. System 600 can be implemented in a building (e.g. building 10) and is shown to include control device 214, network 602, air quality sensors 604, building emergency sensor(s) 606, weather server(s) 608, building management system 610, and user device 612. System 600 connects devices, systems, and servers via network 602 so that building information, HVAC controls, emergency information, navigation directions, and other information can be passed between devices (e.g., control device 214, user device 612, and/or building emergency sensor(s) 606 and servers and systems (e.g., weather server(s) 608 and/or building management system 610). In some embodiments, control device 214 is connected to speakers 504 as described with reference to FIG. 5.

In some embodiments, network 602 communicatively couples the devices, systems, and servers of system 600. In some embodiments, network 602 is at least one of and/or a combination of a Wi-Fi network, a wired Ethernet network, a Zigbee network, and a Bluetooth network. Network 602 may be a local area network or a wide area network (e.g., the Internet, a building WAN, etc.) and may use a variety of communications protocols (e.g., BACnet, IP, LON, etc.) Network 602 may include routers, modems, and/or network switches.

In some embodiments, control device 214 is configured to receive emergency information, navigation directions, occupant information, concierge information, air quality information, and any other information via network 602. In some embodiments, the information is received from building management system 610 via network 602. In various embodiments, the information is received from the Internet via network 602. In some embodiments, control device 214 is at least one of, or a combination of, a thermostat, a humidistat, a light controller, and any other wall mounted and/or hand held device. In some embodiments, the control device 214 is connected to one or more air quality sensors 604. Air quality sensors 604 can include temperature sensors, humidity sensors, carbon dioxide sensors, VOC sensors, etc. In some embodiments, control device 214 is connected to building emergency sensor(s) 606. In some embodiments, building emergency sensor(s) 406 are sensors which detect building emergencies. Building emergency sensor(s) 406 may be smoke detectors, carbon monoxide detectors, carbon dioxide detectors (e.g., carbon dioxide sensors 522), an emergency button (e.g., emergency pull handles, panic buttons, a manual fire alarm button and/or handle, etc.) and/or any other emergency sensor. In some embodiments, the emergency sensor(s) include actuators. The actuators may be building emergency sirens and/or building audio speaker systems (e.g., speakers 504), automatic door and/or window control (e.g., shade control system 512), and any other actuator used in a building.

In some embodiments, control device 214 may be communicatively coupled to weather server(s) 608 via network 602. In some embodiments, the control device 214 may be configured to receive weather alerts (e.g., high and low daily temperature, five day forecast, thirty day forecast, etc.) from weather server(s) 608. Control device 214 may be configured to receive emergency weather alerts (e.g., flood warnings, fire warnings, thunder storm warnings, winter storm warnings, etc.) In some embodiments, control device 214 may be configured to display emergency warnings via a user interface of control device 214 when control device 214 receives an emergency weather alert from weather server(s) 608. The control device 214 may be configured to display emergency warnings based on the data received from building emergency sensor(s) 606. In some embodiments, the control device 214 may cause a siren (e.g., speakers 504 and/or building emergency sensor(s) 606) to alert occupants of the building of an emergency, cause all doors to become locked and/or unlocked, cause an advisory message be broadcast through the building, and control any other actuator or system necessary for responding to a building emergency. In further embodiments, the weather server(s) 608 may be configured to provide air quality information to the control device 214. For example, the weather server(s) 608 may provide air quality information such as pollen levels, mold levels, particulate levels, etc.

In some embodiments, control device 214 is configured to communicate with building management system 610 via network 602. Control device 214 may be configured to transmit environmental setpoints (e.g., temperature setpoint, humidity setpoint, etc.) to building management system 610. In some embodiments, building management system 610 may be configured to cause zones of a building (e.g., building 10) to be controlled to the setpoint received from control device 214. In further embodiments, the building management system 610 may be configured to control one or more fans or ventilators to provide air flow into and out of a building (e.g. building 10). In some embodiments, building management system 610 may be configured to control the lighting of a building. In some embodiments, building management system 610 may be configured to transmit emergency information to control device 214. In some embodiments, the emergency information is a notification of an active shooter lockdown, a tornado warning, a flood warning, a thunderstorm warning, and/or any other warning. In some embodiments, building management system 610 is connected to various weather servers or other web servers from which building management system 610 receives emergency warning information. In various embodiments, building management system is a computing system of a hotel. Building management system 610 may keep track of hotel occupancy, may relay requests to hotel staff, and/or perform any other functions of a hotel computing system.

Control device 214 is configured to communicate with user device 612 via network 602. In some embodiments, user device 612 is a smartphone, a tablet, a laptop computer, and/or any other mobile and/or stationary computing device. In some embodiments, user device 612 communicates calendar information to control device 214. In some embodiments, the calendar information is stored and/or entered by a user into calendar application 614. In some embodiments, calendar application 414 is at least one of Outlook, Google Calendar, Fantastical, Shifts, CloudCal, DigiCal, and/or any other calendar application. In some embodiments, control device 214 receives calendar information from the calendar application such as times and locations of appointments, times and locations of meetings, and/or any other information. Control device 214 may be configured to display building map direction to a user associated with user device 612 and/or any other information.

In some embodiments, a user may press a button on a user interface of control device 214 indicating a building emergency. The user may be able to indicate the type of emergency (e.g., fire, flood, active shooter, etc.) Control device 214 may communicate an alert to building management system 610, user device 612, and any other device, system, and/or server.

Filter Type Replacement Recommendation

Figure 7:
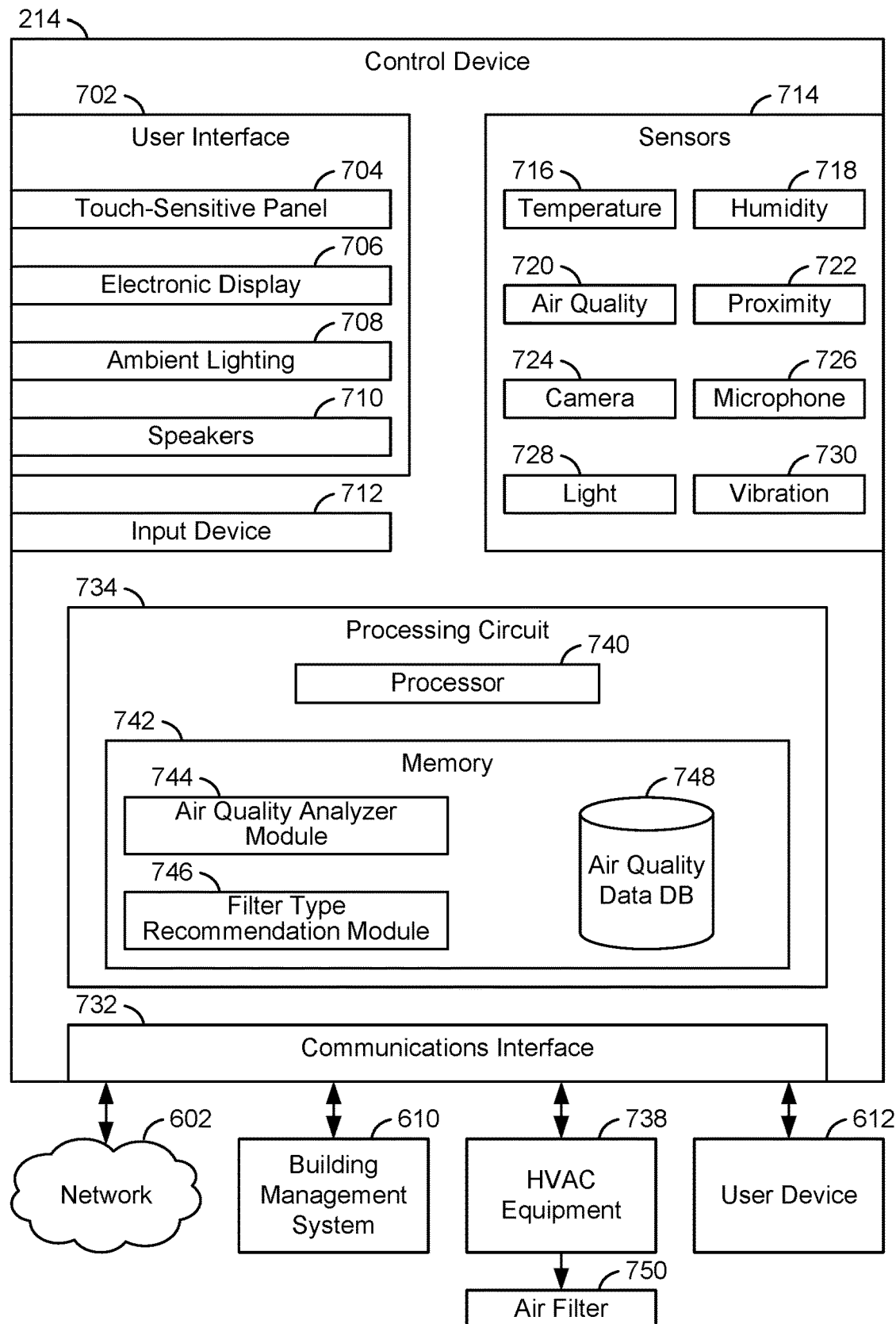
FIG. 7 is a block diagram illustrating the control device of FIGS. 2, 3, and 5 in greater detail, according to embodiments.

Referring now to FIG. 7, a block diagram illustrating control device 214 in greater detail is shown, according to some embodiments. Control device 214 is shown to include a variety of user interface devices 702. User interface devices 702 may be configured to receive input from a user and provide output to a user in various forms. For example, user interface devices 702 are shown to include a touch-sensitive panel 704, an electronic display 706, ambient lighting 708, speakers 710 (e.g., speakers 504), and an input device 712. Input device 712 may include a microphone configured to receive voice commands from a user, a keyboard or buttons, switches, dials, or any other user-operable input device. It is contemplated that user interface devices 702 may include any type of device configured to receive input from a user and/or provide an output to a user in any of a variety of forms (e.g., touch, text, video, graphics, audio, vibration, etc.).

Control device 214 may also include, or be in communication with, a number of sensors 714. Sensors 714 may be configured to measure a variable state or condition of the environment in which control device 214 is installed. For example, sensors 714 are shown to include a temperature sensor 716, a humidity sensor 718, an air quality sensor 720, a proximity sensor 722, a camera 724, a microphone 726, a light sensor 728, and a vibration sensor 730. Air quality sensor 720 may be configured to measure any of a variety of air quality variables such as oxygen level, carbon dioxide level, carbon monoxide level, allergens, pollutants, smoke, VOCs, etc.

Still referring to FIG. 7, control device 214 is shown to include a communications interface 732 and a processing circuit 734. Communications interface 732 may include wired or wireless interfaces (e.g., jacks, antennas, transmitters, receivers, transceivers, wire terminals, etc.) for conducting data communications with various systems, devices, or networks. For example, communications interface 732 may include an Ethernet card and port for sending and receiving data via an Ethernet-based communications network and/or a Wi-Fi transceiver for communicating via a wireless communications network. Communications interface 732 may be configured to communicate via local area networks or wide area networks (e.g., the Internet, a building WAN, etc.) and may use a variety of communications protocols (e.g., BACnet, IP, LON, etc.).

Communications interface 732 may include a network interface configured to facilitate electronic data communications between control device 214 and various external systems or devices (e.g., network 602, building management system 610, HVAC equipment 738, user device 612, etc.). For example, control device 214 may receive information from building management system 610 or HVAC equipment 738 indicating one or more measured states of the controlled building (e.g., temperature, humidity, electric loads, etc.) and one or more states of the HVAC equipment 738 (e.g., equipment status, power consumption, equipment availability, etc.). Communications interface 732 may receive inputs from building management system 610 or HVAC equipment 738 and may provide operating parameters (e.g., on/off decisions, set points, etc.) to building management system 610 or HVAC equipment 738. The operating parameters may cause building management system 610 to activate, deactivate, or adjust a set point for various types of home equipment or building equipment in communication with control device 214.

In some embodiments, HVAC equipment 738 is a blower fan or supply fan. For example, HVAC equipment 738 may be a blower fan used in conjunction with a ventilator for supplying outside air into building 10. In this regard, an air filter 750 can be integrated with HVAC equipment 738 such that outside air is drawn through the air filter 750. Air filter 750 can be adapted and configured to collect airborne particles, for example by using a porous membrane, a filtering media, and the like. Types of air filter 750 can vary according to airflow resistance. For example, an air filter 750 with a less restrictive airflow resistance can be fiberglass or pleated type. In contrast, an air filter 750 with a more restrictive airflow resistance can be a HEPA type. Other types of air filter 750 can be used, such as electrostatic, antibacterial, replaceable, washable, etc.

Processing circuit 734 is shown to include a processor 740 and memory 742. Processor 740 may be a general purpose or specific purpose processor, an application specific integrated circuit (ASIC), one or more field programmable gate arrays (FPGAs), a group of processing components, or other suitable processing components. Processor 740 may be configured to execute computer code or instructions stored in memory 742 or received from other computer readable media (e.g., CDROM, network storage, a remote server, etc.).

Memory 742 may be communicably connected to processor 740 via processing circuit 734 and may include computer code for executing (e.g., by processor 740) one or more processes described herein. Memory 742 may include one or more devices (e.g., memory units, memory devices, storage devices, etc.) for storing data and/or computer code for completing and/or facilitating the various processes described in the present disclosure. Memory 742 may include random access memory (RAM), read-only memory (ROM), hard drive storage, temporary storage, non-volatile memory, flash memory, optical memory, or any other suitable memory for storing software objects and/or computer instructions. Memory 742 may include database components, object code components, script components, or any other type of information structure for supporting the various activities and information structures described in the present disclosure.

Memory 742 is shown to include an air quality analyzer module 744, a filter type recommendation module 746, and an air quality data database 746. Other modules may also be included in the memory 742, such as voice command and control modules, building modules, payment modules, hotel modules, healthcare modules, occupancy modules, emergency modules and the like.

Air quality analyzer module 744 is generally configured to receive measurement information from sensors 714 (e.g. air quality sensor 720) relating to air quality. Air quality measurements can include oxygen level, carbon dioxide level, carbon monoxide level, allergens, pollutants, smoke, VOCs, etc. In this regard, sensors 714 can be integrated into the control device 214. In some embodiments, sensors 714 are additionally or alternatively located at various points within building 10. Air quality analyzer module 744 is generally configured to store measurement information in air quality data database 748 and/or transmit to filter type recommendation module 746.

In some arrangements, air quality analyzer module 744 calculates an air quality metric based on receive measurement information from sensors 714. The air quality metric can be a numerical value representative of various air quality measurements. For example, the air quality metric can be a scaled sum of two air quality parameters, such as VOC and pollen, whereby both parameters are equally weighted. In this regard, the calculated air quality metric can generally be commensurate with VOC and pollen measurements. Embodiments can use any formula for calculating the air quality metric, for example with any number of parameters and weight.

In some embodiments, air quality analyzer module 744 is configured to calculate an air quality metric corresponding to a discrete time period, such as a day, a week, or a month. For example, air quality analyzer module 744 can calculate a daily air quality metric based on air quality measurements continuously received throughout the day. In other embodiments, the daily air quality metric can be calculated based on measurements received at one particular time of the day. In this regard, the received measurements corresponding to the particular time can be considered representative of the day.

In some embodiments, air quality analyzer 744 is configured to additionally calculate a running average metric using a set of calculated air quality metrics. For example, the set of calculated air quality metrics can include thirty calculated air quality metrics corresponding to a thirty day period. The running average metric can be an average value of each calculated air quality metric in the set. When a subsequent air quality metric is calculated, such as on day thirty-one, the running average metric is recalculated to correspond to the updated set of thirty-one calculated air quality metrics. Air quality analyzer module 744 can be configured to transmit the air quality metric and the running average metric to database 748 for storage.

Filter type recommendation module 746 is generally configured to receive information relating to air quality (e.g. the running average metric), generate a filter type recommendation, and provide the recommendation to a user. Received information can relate to indoor air quality measurements obtained from sensors 714. For example, filter type recommendation module 746 can be configured to receive the running average metric from database 748. In some embodiments, filter type recommendation module 746 is configured to directly receive air quality measurements from sensors 714. In some embodiments, received information can also relate to data provided by an external or third party source. For example, filter type recommendation module 746 can receive general data relating to allergen (e.g. pollen) levels or trends within a particular geographic area, such as via weather server 608. In some embodiments, filter type recommendation module 746 is also configured to receive user input information. For example, the user can interact with user interface 702 and/or user device 612 to provide input information relating to a current filter type, a length of use of the current filter, etc.

In some embodiments, filter type recommendation module 746 is also configured to facilitate timing of a filter replacement. In this regard, filter type recommendation module 746 can be configured to receive indoor air quality measurements obtained from sensors 714 and/or user input information from a user via user interface 702. For example, received information relating to air quality measurements and/or a trend of air quality measurements can indicate an air filter is clogged or sufficiently underperforming. Filter type recommendation module 746 can be configured to provide a replacement alert via user interface 702 indicating a current filter needs replacement. In some embodiments, filter type recommendation module 746 is configured to receive input information from a user (e.g. via interaction with user interface 702) relating to a current filter type and a date a current filter was installed. In this regard, filter type recommendation module 746 can provide the replacement alert based on an anticipated lifetime associated with the filter type. For example, if a HEPA filter has an anticipated lifetime of one year, filter type recommendation module 746 can be configured to provide the replacement alert approximately one year after the date the current filter was installed. In some embodiments, the replacement alert is provided with a filter recommendation type.

The filter type recommendation module 746 is generally configured to generate a filter type recommendation based on received information. In some embodiments, filter type recommendation module 746 generates the recommendation based on comparing an air quality metric, such as the running average metric, to a threshold value. If the air quality metric is below the threshold value, then filter type recommendation module 746 can be configured to generate a recommendation corresponding to a less restrictive filter type, such as a fiberglass or pleated filter. If the air quality metric is above the threshold value, then filter type recommendation module 746 can be configured to generate a recommendation corresponding to a more restrictive filter type, such as a HEPA filter. In some embodiments, the filter type recommendation module 746 is configured to only generate a recommendation after a minimum period of time. Minimum time can correspond to a defined time period, such as a month, four months, etc. In some embodiments, the minimum time value can be configured to ensure that filter recommendations or reminders are only triggered after filter type recommendation module 746 has had sufficient time to determine if a different filter type should be suggested to the user for the next filter change.

In some arrangements, filter type recommendation module 746 is configured to provide the recommendation to the user after generating the recommendation. For example, electronic display 706 of user interface 702 can be configured to display a filter type recommendation. In some embodiments, filter type recommendation module 746 is configured to additionally or alternatively store the recommendation in air quality data database 748. In this regard, filter type recommendation module 746 can be configured to retrieve and display the filter type recommendation after a time period. For example, the filter type recommendation can be included with a subsequent filter replacement reminder provided by control device 214.

Air quality data database 748 is generally configured to store information relating to air quality and filter recommendations and selectively provide access to the stored information. In this regard, air quality data database 748 is communicably and operatively coupled to air quality analyzer module 744 and to the filter type recommendation module 746. Stored information can relate to sensor measurements obtained by sensors 714, calculated air quality metrics, and/or running average metrics. In some embodiments, air quality data database 748 also stores information relating to data received by an external or third party source (e.g. general data relating to allergen levels within a particular geographic area). In some embodiments, the air quality database 748 also stores information relating to an air filter 750 of HVAC equipment 738, such as a current filter type, an age of a current filter, general filter types, filter recommendations, filter maintenance, and the like. The air quality database 748 can be configured to store any type of information for facilitating filter-type replacement recommendations.

Figure 8:
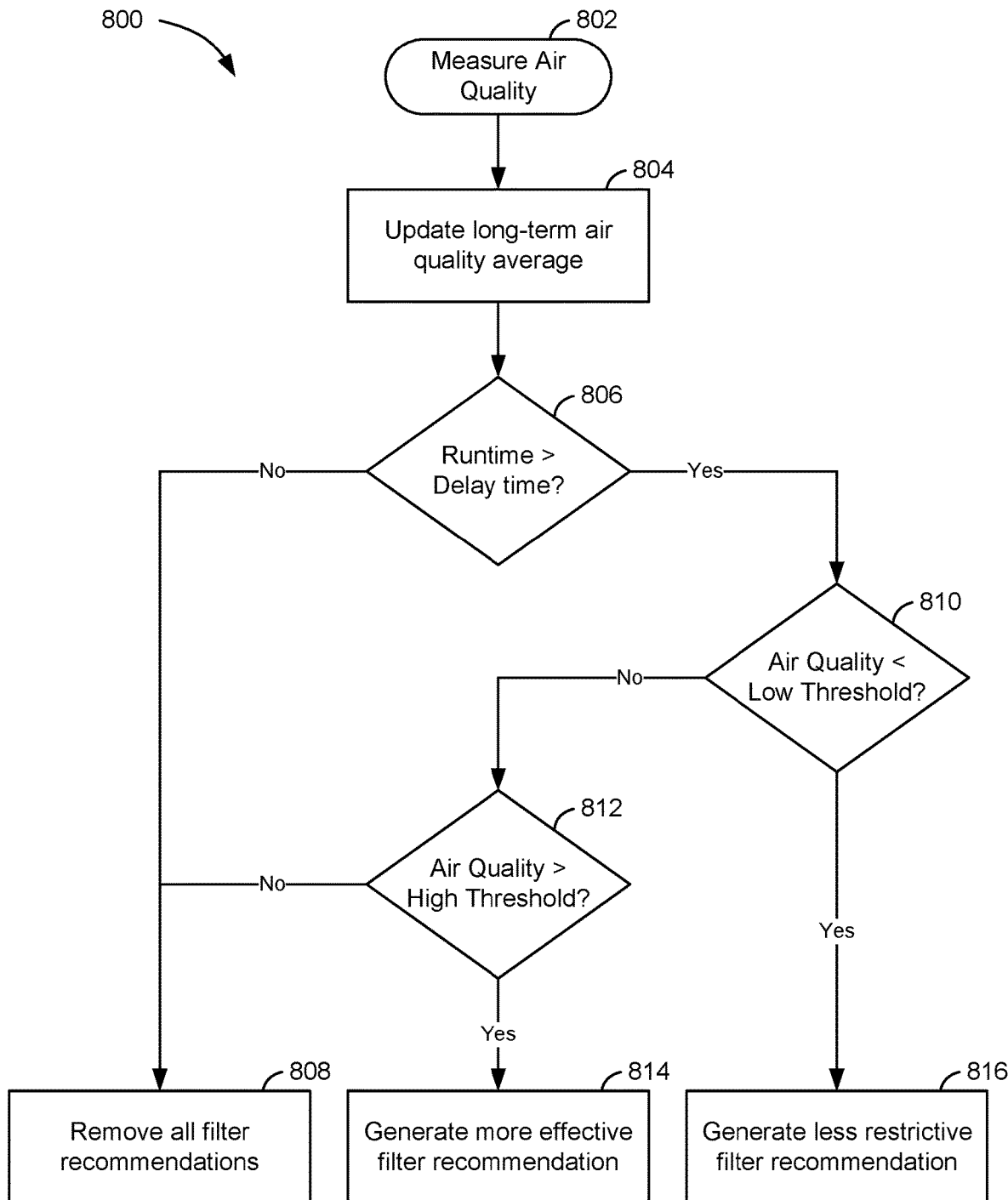
FIG. 8 is a flow diagram illustrating a process for generating filter type replacement recommendations, according to embodiments.

Turning now to FIG. 8, a process 800 for recommending a filter type is shown, according to some embodiments. In some arrangements, control device 214 performs process 800. In some arrangements, control device 214 repeats process 800 according to a predetermined frequency (e.g. daily, weekly, monthly). In this regard, process 800 can calculate a running long-term air quality average metric (e.g. at step 804) that updates with each iteration of process 800 repeating.

Control device 214 can be configured as shown in FIG. 7 to receive input information from sensors 714 relating to air quality measurements of building 10. Building 10 generally includes one or more HVAC equipment 738, such as a blower fan for supplying outside air into building 10. An air filter 750 can be integrated with HVAC equipment 738 such that outside air and/or return air is drawn through the air filter 750. Air filter 750 can be adapted and configured to collect airborne particles, for example by using a porous membrane, a filtering media, and the like. Types of air filter 750 can vary according to airflow resistance. For example, air filter 750 with a less restrictive airflow resistance can be fiberglass or pleated type. In contrast, air filter 750 with a more restrictive airflow resistance can be a HEPA type. Other types of air filter 750 can be used, such as electrostatic, antibacterial, replaceable, washable, etc.

At step 802, air quality is measured. Measured air quality can relate to oxygen level, carbon dioxide level, carbon monoxide level, allergens, pollutants, smoke, VOCs, etc. In some embodiments, control device 214 transmits control signals to sensors 714 instructing sensors 714 to measure air quality of building 10. In this regard, sensors 714 can be integrated with the control device 214 and located at various locations within building 10. In some embodiments, control device 214 is configured to receive and store received air quality measurements, such as in air quality data database 748.

In some arrangements, control device 214 calculates an air quality metric based on measured air quality. The calculated air quality metric can correspond to a discrete time period, such as a day, week, or a month. For example, a daily air quality metric can be calculated based on air quality measurements continuously received throughout the day. In other embodiments, the daily air quality metric can be calculated based on measurements received at one particular time of the day. In this regard, the received measurements corresponding to the particular time can be considered representative of the day.

At step 804, a long-term air quality average metric is updated. The long-term air quality average generally relates to a running average metric value using a set of calculated air quality metrics. For example, a current value of the long-term air quality average metric can correspond to a set of thirty calculated air quality metrics, whereby each calculated metric in the set corresponds to one day in a thirty day period. In this regard, process 800, including step 804, may repeat on day thirty-one, and accordingly the long-term air quality average metric is recalculated to correspond to the updated set of thirty-one calculated air quality metrics.

At step 806, a runtime value is compared to a delay time value. In an embodiment, the runtime value represents an actual time of use of air filter 750. The delay time value generally represents a predetermined threshold time value corresponding to a minimum time before recommendations are provided. The delay time value can be any value, such as one week, one month, etc. In this regard, the delay time value can be configured to ensure that filter recommendations or reminders are only triggered after control device 214 has had sufficient time to determine if a different filter type should be suggested to the user for the next filter change.

If control device 214 determines runtime is not greater than delay time, process 800 continues to step 808, whereby the control device 214 removes all filter recommendations. For example, in some embodiments, electronic display 706 of control device 214 can be configured to display a filter recommendation. In this regard, at step 808, control device 214 is configured to remove all filter recommendations displayed on electronic display 706. The process may end at step 808.

If control device 214 determines runtime is greater than delay time, process 800 continues to steps 810 and 812, whereby the running average metric is compared to a low threshold (step 810) and compared to a high threshold (step 812). In general, when the running average metric is within the low threshold and high threshold, control device 214 determines the air filter type is sufficiently suitable such that no recommendations are necessary (step 808).

At step 810, control device 214 determines whether the running average metric is below the low threshold. The low threshold is generally a predetermined value corresponding to consistently high air quality in building 10. In this regard, when the running average metric is less than the low threshold, control device 214 is configured to continue to step 816 and generate a less restrictive filter type recommendation, such as a fiberglass or pleated filter. The user can subsequently install a replacement air filter type based on the generated recommendation. In this regard, the user can save money in operating an HVAC system while still maintaining a sufficiently adequate air quality. At step 816 the process may end.

When the running average metric is greater than the low threshold, the process continues to step 812. At step 812, control device 214 determines whether the running average metric is above the high threshold. The high threshold is generally a predetermined air quality value corresponding to consistently low air quality. In this regard, when the running average metric is above the high threshold, control device 214 is configured to continue to step 814 and generate a more restrictive filter type recommendation, such as a HEPA air filter. The user can subsequently install a replacement air filter type based on the generated recommendation. In this regard, control device 214 can help the user improve air quality to adequately maintain a healthy environment. At step 814 the process may end.

In some embodiments, electronic display 706 of control device 214 is configured to visually provide the generated filter recommendation (e.g. at steps 814, 816) to the user. In some embodiments, control device 214 immediately provides the generated filter recommendation on electronic display 706 after steps 814 or 816. In other embodiments, control device 214 is configured to store the filter recommendation and only display the filter recommendation according to a condition. For example, control device 214 may be configured to retrieve and display the filter type recommendation in conjunction with a future filter replacement reminder generated by control device 214.

Configuration of Embodiments

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An HVAC system within a building comprising:
   an HVAC device comprising an air filter;
   one or more sensors configured to measure air quality within the building; and
   a control device comprising a processor and a memory, the processor configured to:
      receive a user input indicating a first filter parameter;
      determine an air quality metric, wherein the air quality metric is determined based on data relating to at least one allergen in a geographic region associated with the HVAC device; and
      generate an air filter type recommendation based on the air quality metric and the first filter parameter.

2. The system of claim 1, wherein the control device is a thermostat.

3. The system of claim 1, wherein the one or more sensors include at least one of a volatile organic compound (VOC) sensor, a carbon dioxide sensor, and a pollen sensor.

4. The system of claim 1, wherein the at least one allergen is a plurality of allergens, and wherein the generate an air filter type recommendation comprises:
compare a total number of allergens in the plurality of allergens to a low threshold value; and
when the total number of allergens in the plurality of allergens is less than the low threshold value, generate an air filter type recommendation corresponding to a less restrictive filter.

5. The system of claim 4, wherein the less restrictive filter is configured to reduce energy consumption of the HVAC system.

6. The system of claim 5, wherein the less restrictive filter is one of a fiberglass filter or a similar pleated filter.

7. The system of claim 1, wherein the at least one allergen is a plurality of allergens, and wherein the generate an air filter type recommendation and wherein the generate an air filter type recommendation comprises:
compare a total number of allergens in the plurality of allergens to a high threshold value; and
when the total number of allergens in the plurality of allergens is greater than the high threshold value, generate an air filter type recommendation corresponding to a more restrictive filter.

8. The system of claim 7, wherein the more restrictive filter is configured to improve air quality in the building.

9. The system of claim 8, wherein the more restrictive filter is one of a HEPA filter, a carbon filter, or another similar filter.

10. The system of claim 1, wherein the at least one allergen is a plurality of allergens, and wherein the generate an air filter type recommendation comprises:
compare a total number of allergens in the plurality of allergens to a low threshold value and a high threshold value; and
when the total number of allergens in the plurality of allergens is between the low threshold value and the high threshold value, generate an air filter type recommendation corresponding to a similar type of air filter as is currently installed in the HVAC device.

11. A method for recommending filter types to be used in an HVAC system of a building comprising:
obtaining, by one or more sources, an indication of air quality within a geographic region of the building;
calculating, by a control device, an air quality metric based on the indication;
receiving, by the control device, a user input indicating a first filter parameter; and
generating, by the control device, an air filter type recommendation based on the air quality metric and the first filter parameter.

12. The method of claim 11, further comprising comparing, by the control device, the air quality metric to a low threshold value.

13. The method of claim 12, wherein the air filter type recommendation is for a less restrictive filter configured to reduce energy consumption of the HVAC system if the air quality metric is less than the low threshold value.

14. The method of claim 13, wherein the less restrictive filter is one of a fiberglass filter or a similar pleated filter.

15. The method of claim 12, further comprising comparing, by the control device, the air quality metric to a high threshold value.

16. The method of claim 15, wherein the air filter type recommendation is for a more restrictive filter configured to improve air quality within the building if the air quality metric is greater than the high threshold value.

17. The method of claim 16, wherein the more restrictive filter is one of a HEPA filter, a carbon filter, or another similar filter.

18. The method of claim 15, wherein the air filter type recommendation is for a similar type of filter as is currently installed if the air quality metric is less than the high threshold value and greater than the low threshold value.

19. The method of claim 11, wherein the control device is a thermostat.

20. The method of claim 11, wherein the one or more sources include at least one of a volatile organic compound (VOC) sensor, a carbon dioxide sensor, a pollen sensor, a user selection, or an external source.

* * * * *